US012659262B2

(12) United States Patent (10) Patent No.: US 12,659,262 B2

Nyamwange et al. (45) Date of Patent: *Jun. 16, 2026

(54) SYSTEM AND METHOD FOR SELECTIVE DATA ROUTING IN A DISTRIBUTED NETWORK VIA DATA THROUGHPUT ANALYSIS

(71) Applicant: BANK OF AMERICA CORPORATION, Charlotte, NC (US)

(72) Inventors: Elvis Nyamwange, Little Elm, TX (US); Amer Ali, Jersey City, NJ (US); Erik Dahl, Newark, DE (US); Pratap Dande, Saint Johns, FL (US); Brian Neal Jacobson, Los Angeles, CA (US); Rahul Shashidhar Phadnis, Charlotte, NC (US); Sailesh Vezzu, Hillsborough, NJ (US); Hari Vuppala, Charlotte, NC (US); Rahul Yaksh, Austin, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 155 days.

This patent is subject to a terminal disclaimer.

(21) Appl. No.: 18/611,935

(22) Filed: Mar. 21, 2024

(65) Prior Publication Data

US 2025/0030625 A1 Jan. 23, 2025

Related U.S. Application Data

(63) Continuation of application No. 18/223,176, filed on Jul. 18, 2023, now Pat. No. 11,985,056.

(51) Int. Cl.
H04L 45/12 (2022.01)
H04L 45/42 (2022.01)

(52) U.S. Cl.
CPC ............ H04L 45/123 (2013.01); H04L 45/42 (2013.01)

(58) Field of Classification Search
CPC ..... H04L 45/30; H04L 45/38; H04L 15/8055; H04L 15/8061; H04L 2215/7471
See application file for complete search history.

(56) References Cited

U.S. PATENT DOCUMENTS

| | | | |
|---|---|---|---|
| 6,546,017 B1 * | 4/2003 | Khaunte | ............. H04L 47/2433 370/468 |
| 7,254,344 B2 | 8/2007 | Kim et al. | |
| 7,283,701 B2 | 10/2007 | Hallemeier et al. | |

(Continued)

*Primary Examiner* — Douglas B Blair

(74) *Attorney, Agent, or Firm* — Moore & Van Allen PLLC; Andrew T. Wood

(57) ABSTRACT

Systems, computer program products, and methods are described herein for selective data routing in a distributed network via data throughput analysis in a distributed ledger network. The present invention is configured to receive a request for a data transmission from an endpoint device of a network, determine, via a routing module, a throughput of data associated with the data transmission, determine a classification of the data transmission, and assign the data transmission to an assigned routing channel. The assigned routing channel may include either a first routing channel or a second routing channel based on the classification, wherein the first routing channel is a light load network, and wherein the second routing channel is a heavy load network comprising a first multicore optical fiber.

20 Claims, 5 Drawing Sheets

(56) References Cited

U.S. PATENT DOCUMENTS

| | | | |
|---|---|---|---|
| 9,042,727 B2 * | 5/2015 | Cortez | H04J 3/1682 |
| | | | 370/227 |
| 9,086,519 B2 | 7/2015 | Arakawa et al. | |
| 9,172,624 B1 * | 10/2015 | Naik | H04L 43/0811 |
| 10,429,051 B1 | 10/2019 | Tran | |
| 10,505,631 B1 | 12/2019 | Sundar Pal et al. | |
| 10,805,006 B2 | 10/2020 | Shen et al. | |
| 10,812,325 B1 * | 10/2020 | Moore | H04Q 11/0067 |
| 11,012,869 B1 | 5/2021 | Kwatra et al. | |
| 11,239,917 B2 | 2/2022 | Rekaya et al. | |
| 2003/0072525 A1 | 4/2003 | Sjodin et al. | |
| 2006/0072543 A1 * | 4/2006 | Lloyd | H04L 47/24 |
| | | | 370/351 |
| 2006/0142020 A1 * | 6/2006 | Mueckenheim | H04W 72/52 |
| | | | 455/450 |
| 2012/0134679 A1 | 5/2012 | Tichborne et al. | |
| 2014/0226983 A1 * | 8/2014 | Vargas | H04N 21/41422 |
| | | | 398/66 |
| 2015/0172155 A1 * | 6/2015 | Hong | H04L 67/61 |
| | | | 709/224 |
| 2018/0159621 A1 * | 6/2018 | Beas Bujanos | H04B 10/116 |
| 2020/0067768 A1 * | 2/2020 | Dome | H04L 41/5025 |
| 2020/0394025 A1 * | 12/2020 | Mindus | G06F 3/147 |
| 2021/0345101 A1 | 11/2021 | Hardter et al. | |
| 2022/0014970 A1 * | 1/2022 | Cao | H04W 72/569 |
| 2022/0014995 A1 * | 1/2022 | Cao | H04W 36/304 |
| 2022/0271859 A1 | 8/2022 | Chen et al. | |
| 2023/0026901 A1 | 1/2023 | Matsumoto et al. | |
| 2023/0058200 A1 * | 2/2023 | Singh | H04L 45/14 |
| 2023/0066541 A1 * | 3/2023 | Hand | H04J 14/0282 |
| 2023/0209230 A1 * | 6/2023 | Larrigan | H04J 14/0284 |
| | | | 398/58 |
| 2023/0246726 A1 | 8/2023 | Kunjidhapatham et al. | |
| 2023/0262066 A1 | 8/2023 | Arumugam Maharaja et al. | |

* cited by examiner

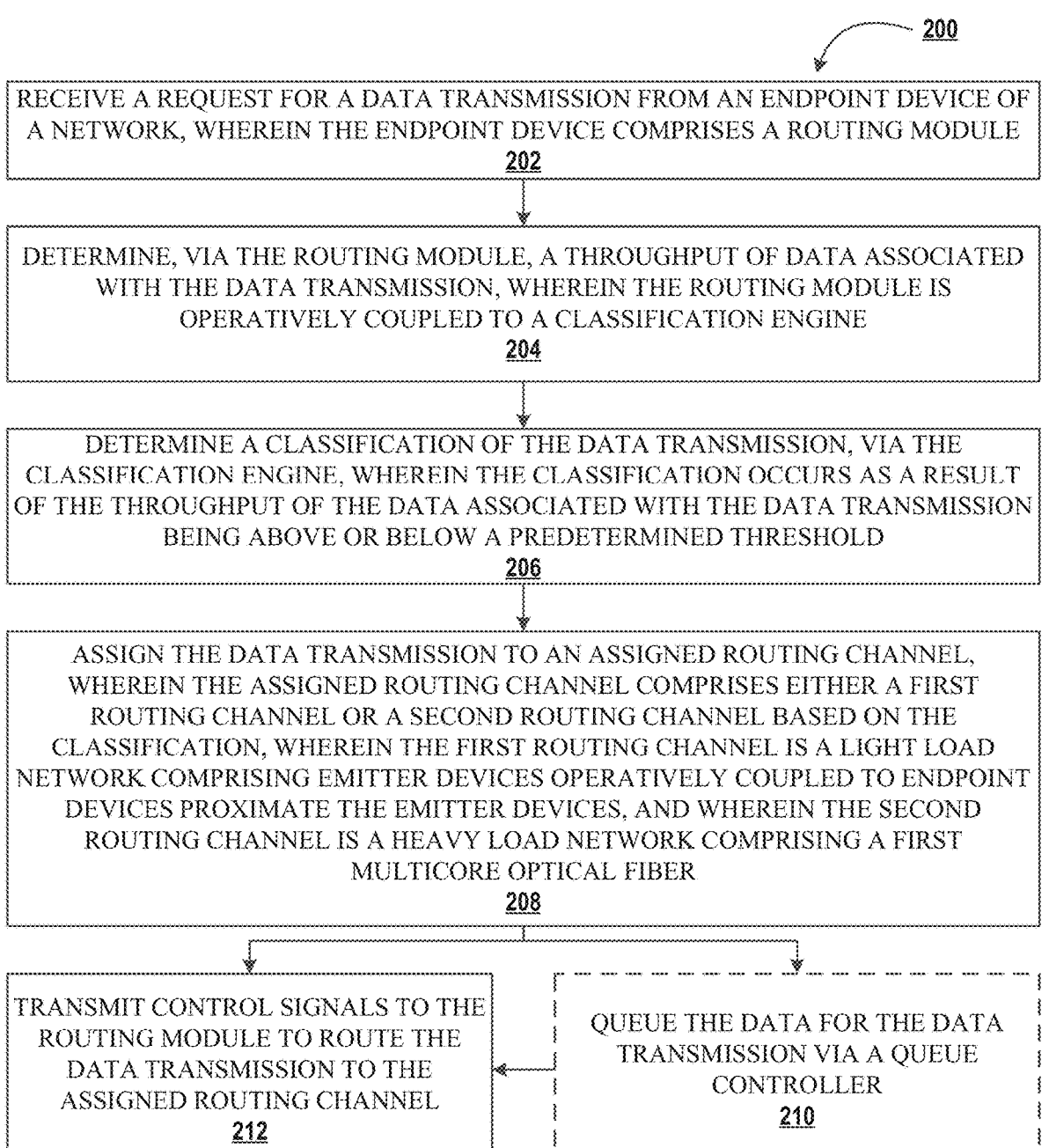

RECEIVE A REQUEST FOR A DATA TRANSMISSION FROM AN ENDPOINT DEVICE OF A NETWORK, WHEREIN THE ENDPOINT DEVICE COMPRISES A ROUTING MODULE
202

DETERMINE, VIA THE ROUTING MODULE, A THROUGHPUT OF DATA ASSOCIATED WITH THE DATA TRANSMISSION, WHEREIN THE ROUTING MODULE IS OPERATIVELY COUPLED TO A CLASSIFICATION ENGINE
204

DETERMINE A CLASSIFICATION OF THE DATA TRANSMISSION, VIA THE CLASSIFICATION ENGINE, WHEREIN THE CLASSIFICATION OCCURS AS A RESULT OF THE THROUGHPUT OF THE DATA ASSOCIATED WITH THE DATA TRANSMISSION BEING ABOVE OR BELOW A PREDETERMINED THRESHOLD
206

ASSIGN THE DATA TRANSMISSION TO AN ASSIGNED ROUTING CHANNEL, WHEREIN THE ASSIGNED ROUTING CHANNEL COMPRISES EITHER A FIRST ROUTING CHANNEL OR A SECOND ROUTING CHANNEL BASED ON THE CLASSIFICATION, WHEREIN THE FIRST ROUTING CHANNEL IS A LIGHT LOAD NETWORK COMPRISING EMITTER DEVICES OPERATIVELY COUPLED TO ENDPOINT DEVICES PROXIMATE THE EMITTER DEVICES, AND WHEREIN THE SECOND ROUTING CHANNEL IS A HEAVY LOAD NETWORK COMPRISING A FIRST MULTICORE OPTICAL FIBER
208

TRANSMIT CONTROL SIGNALS TO THE ROUTING MODULE TO ROUTE THE DATA TRANSMISSION TO THE ASSIGNED ROUTING CHANNEL
212

QUEUE THE DATA FOR THE DATA TRANSMISSION VIA A QUEUE CONTROLLER
210

FIG. 2

SYSTEM AND METHOD FOR SELECTIVE DATA ROUTING IN A DISTRIBUTED NETWORK VIA DATA THROUGHPUT ANALYSIS

CROSS-REFERENCE TO RELATED APPLICATION

This application is a continuation of and claims priority to U.S. patent application Ser. No. 18/223,176 filed Jul. 18, 202, of the same title; the contents of which are also incorporated herein by reference.

FIELD OF THE INVENTION

The present invention embraces a system for selective data routing in a distributed network via data throughput analysis in a distributed ledger network.

BACKGROUND

In the current landscape of high-speed data routing via optical fiber networks, one of the pressing challenges is maintaining adequate bandwidth. Traditional single core optical fibers are prone to performance issues due to their limited capacity to balance light load traffic with heavy load traffic. Moreover, such single core optical fibers often require routine maintenance that is costly and time-consuming. To effectively address this issue, there is a need for a system to route data in a selective manner to maintain bandwidth through networks optimized to transmit the data selectively sent thereto. By implementing such a solution, entities can enhance their ability to transmit light and heavy load data traffic with minimal interruptions or bottlenecking.

BRIEF SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for selective data routing in a distributed network via data throughput analysis in a distributed ledger network is presented. The system may include a processing device, and a non-transitory storage device comprising instructions that, when executed by the processing device, causes the processing device to perform the steps of: receive a request for a data transmission from an endpoint device of a network, wherein the endpoint device may include a routing module, determine, via the routing module, a throughput of data associated with the data transmission, wherein the routing module is operatively coupled to a classification engine, determine a classification of the data transmission, via the classification engine, wherein the classification occurs as a result of the throughput of the data associated with the data transmission being above or below a predetermined threshold, assign the data transmission to an assigned routing channel, wherein the assigned routing channel may include either a first routing channel or a second routing channel based on the classification, wherein the first routing channel is a light load network comprising emitter devices operatively coupled to endpoint devices proximate the emitter devices, and wherein the second routing channel is a heavy load network comprising a first multicore optical fiber, queue the data for the data transmission via a queue controller, and transmit control signals to the routing module to route the data transmission to the assigned routing channel.

In some embodiments, the routing module is further operatively coupled to a second classification engine.

In some embodiments, the second classification engine is operatively coupled to the routing modules corresponding to a plurality of endpoint devices.

In some embodiments, the queue controller ensures that the data transmission for the endpoint device is either on standby or completed before moving on to a second endpoint device.

In some embodiments, the emitter devices are operatively coupled to a second multicore optical fiber, and the first multicore optical fiber is operatively coupled to a first network carrier and the second multicore optical fiber is operatively coupled to a second network carrier.

In some embodiments, the data transmission to an assigned routing channel may include assigning the data transmission to the first routing channel when the throughput of the data is below the predetermined threshold.

In some embodiments, the data transmission to an assigned routing channel may include assigning the data transmission to the second routing channel when the throughput of the data is above the predetermined threshold.

In another aspect, a computer program product for selective data routing in a distributed network via data throughput analysis in a distributed ledger network is presented. The computer program product may include a non-transitory computer-readable medium including code causing an apparatus to receive a request for a data transmission from an endpoint device of a network, wherein the endpoint device may include a routing module, determine, via the routing module, a throughput of data associated with the data transmission, wherein the routing module is operatively coupled to a classification engine, determine a classification of the data transmission, via the classification engine, wherein the classification occurs as a result of the throughput of the data associated with the data transmission being above or below a predetermined threshold, assign the data transmission to an assigned routing channel, wherein the assigned routing channel may include either a first routing channel or a second routing channel based on the classification, wherein the first routing channel is a light load network comprising emitter devices operatively coupled to endpoint devices proximate the emitter devices, and wherein the second routing channel is a heavy load network comprising a first multicore optical fiber, transmit control signals to the routing module to route the data transmission to the assigned routing channel, queue the data for the data transmission via a queue controller, and transmit the data via the assigned routing channel.

In yet another aspect, a method for selective data routing in a distributed network via data throughput analysis in a distributed ledger network is presented. The method may include receiving a request for a data transmission from an endpoint device of a network, wherein the endpoint device may include a routing module, determining, via the routing module, a throughput of data associated with the data transmission, wherein the routing module is operatively coupled to a classification engine, determining a classification of the data transmission, via the classification engine, wherein the classification occurs as a result of the throughput of the data associated with the data transmission being above or below a predetermined threshold, assigning the data transmission to an assigned routing channel, wherein the assigned routing channel may include either a first routing channel or a second routing channel based on the classification, wherein the first routing channel is a light load network comprising emitter devices operatively coupled to endpoint devices proximate the emitter devices, and wherein the second routing channel is a heavy load network comprising a first multicore optical fiber, transmitting control signals to the routing module to route the data transmission to the assigned routing channel, queueing the data for the data transmission via a queue controller, and transmitting the data via the assigned routing channel.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
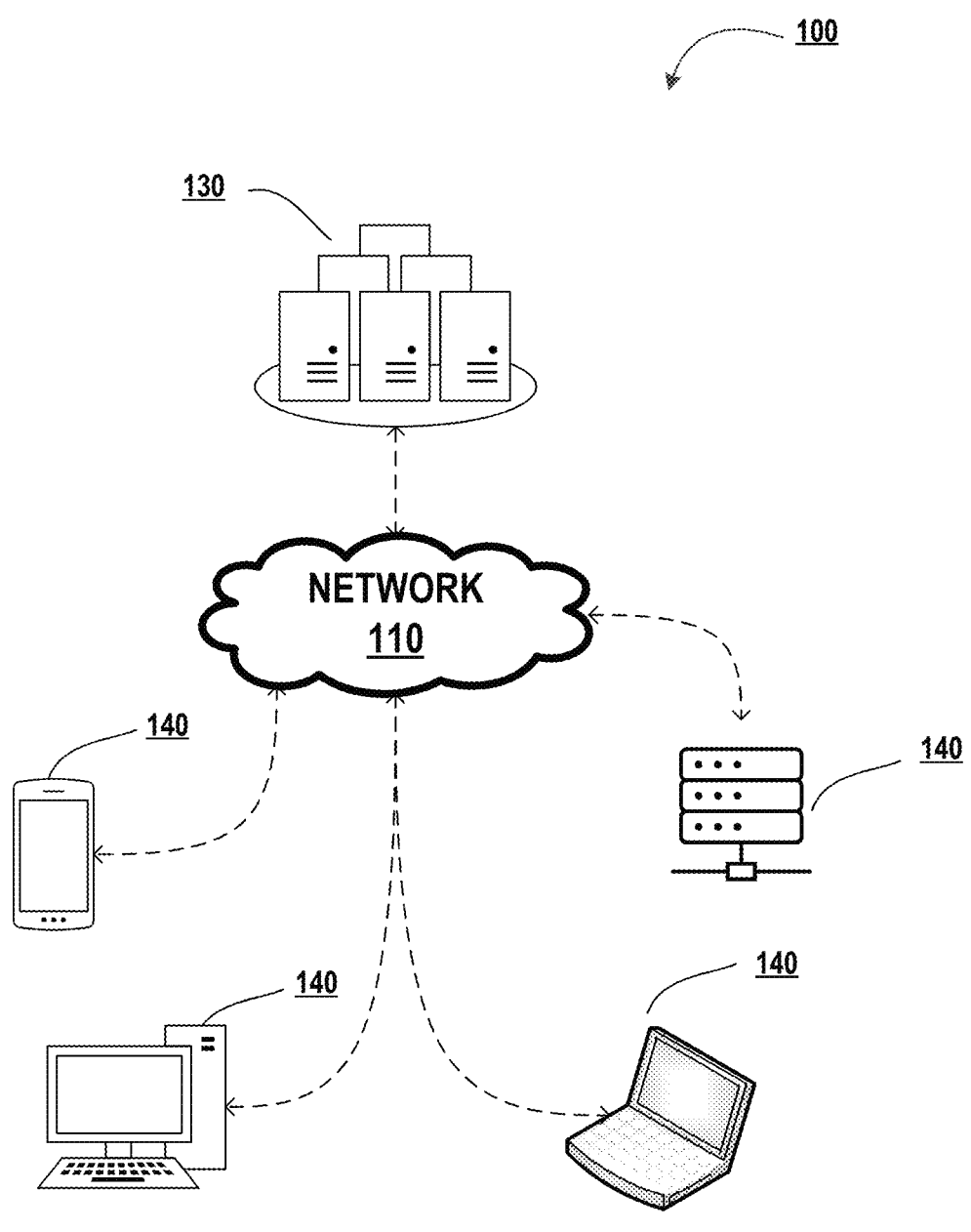
Figure 1B:
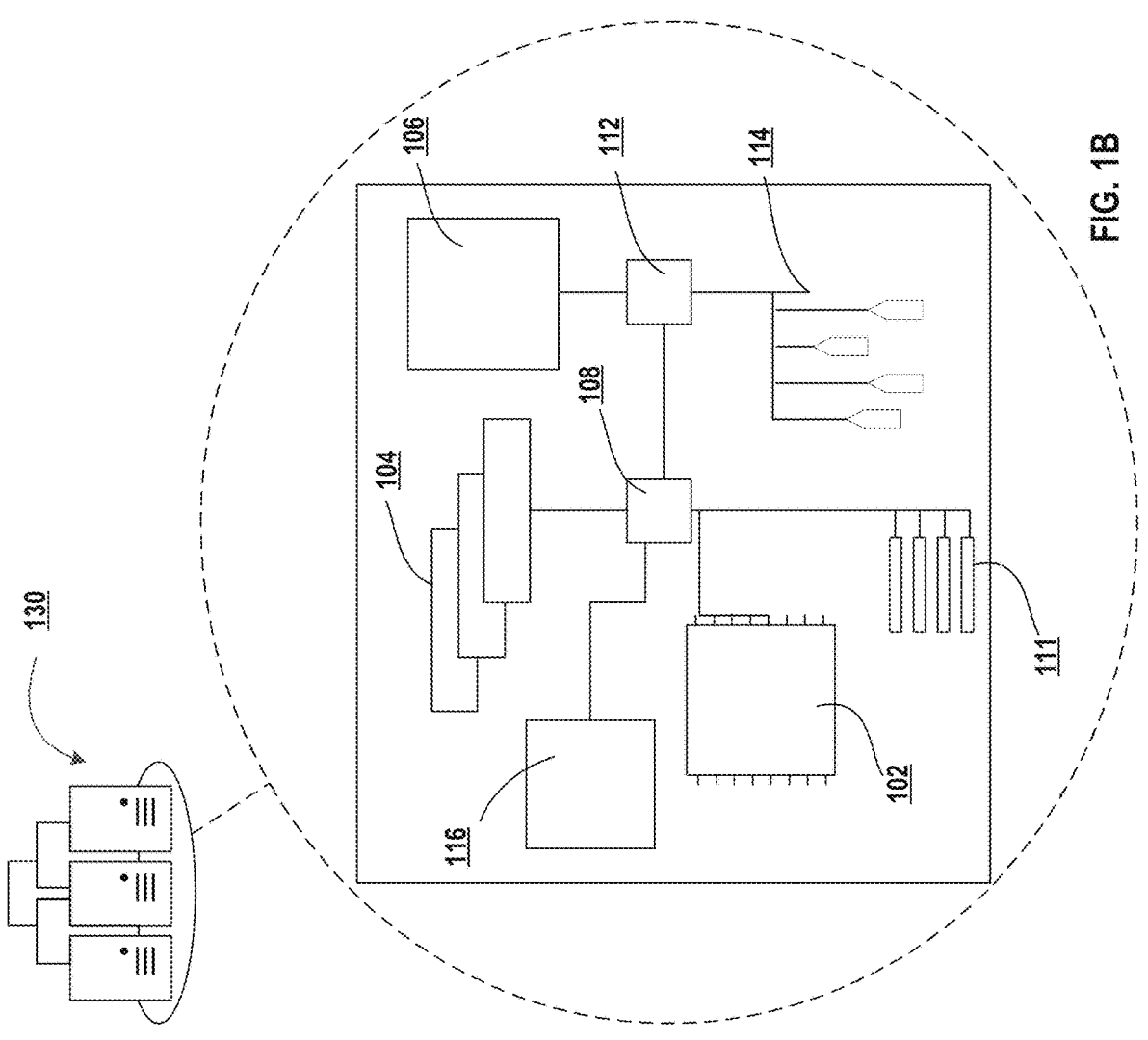
Figure 1C:
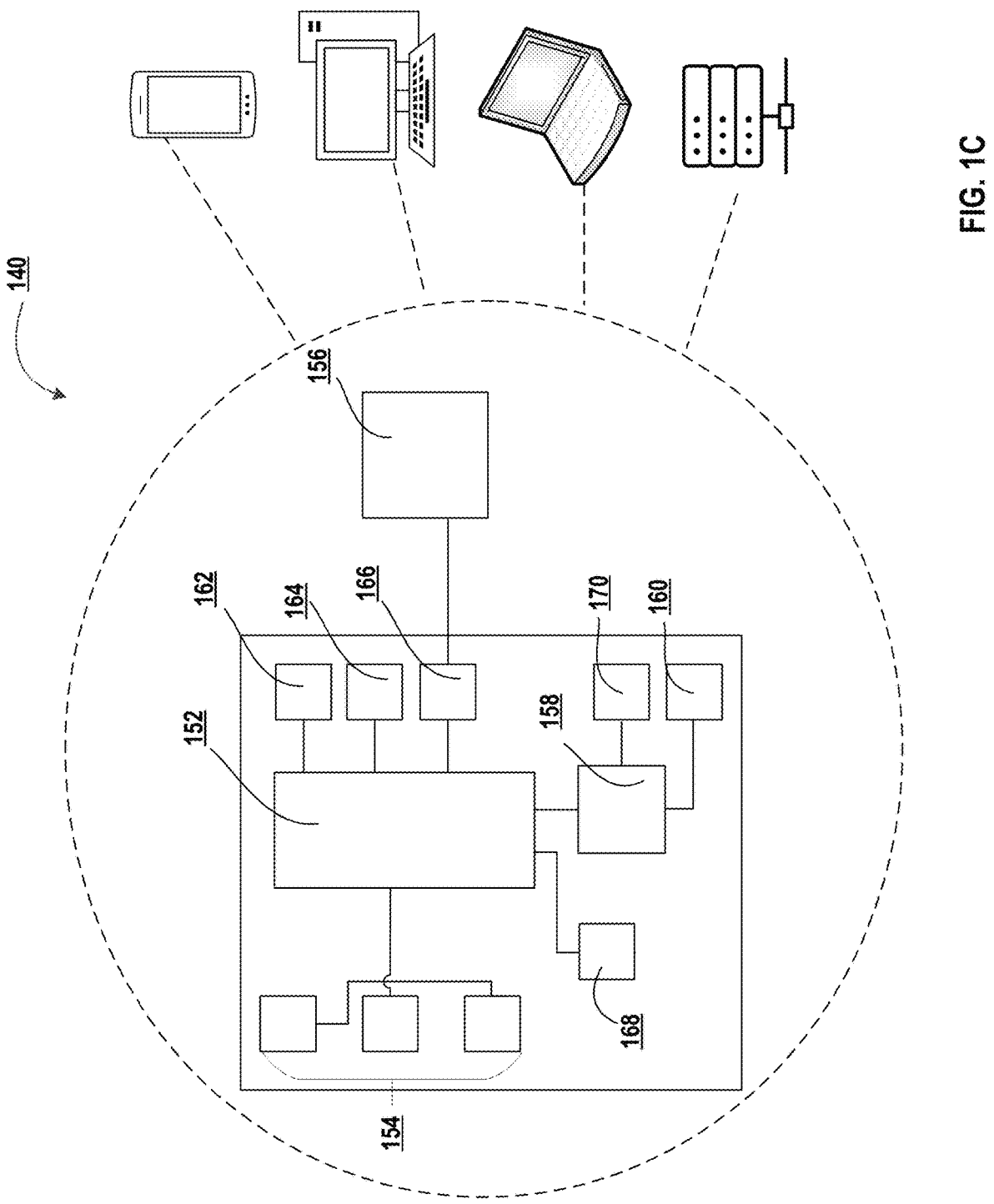
Figure 3:
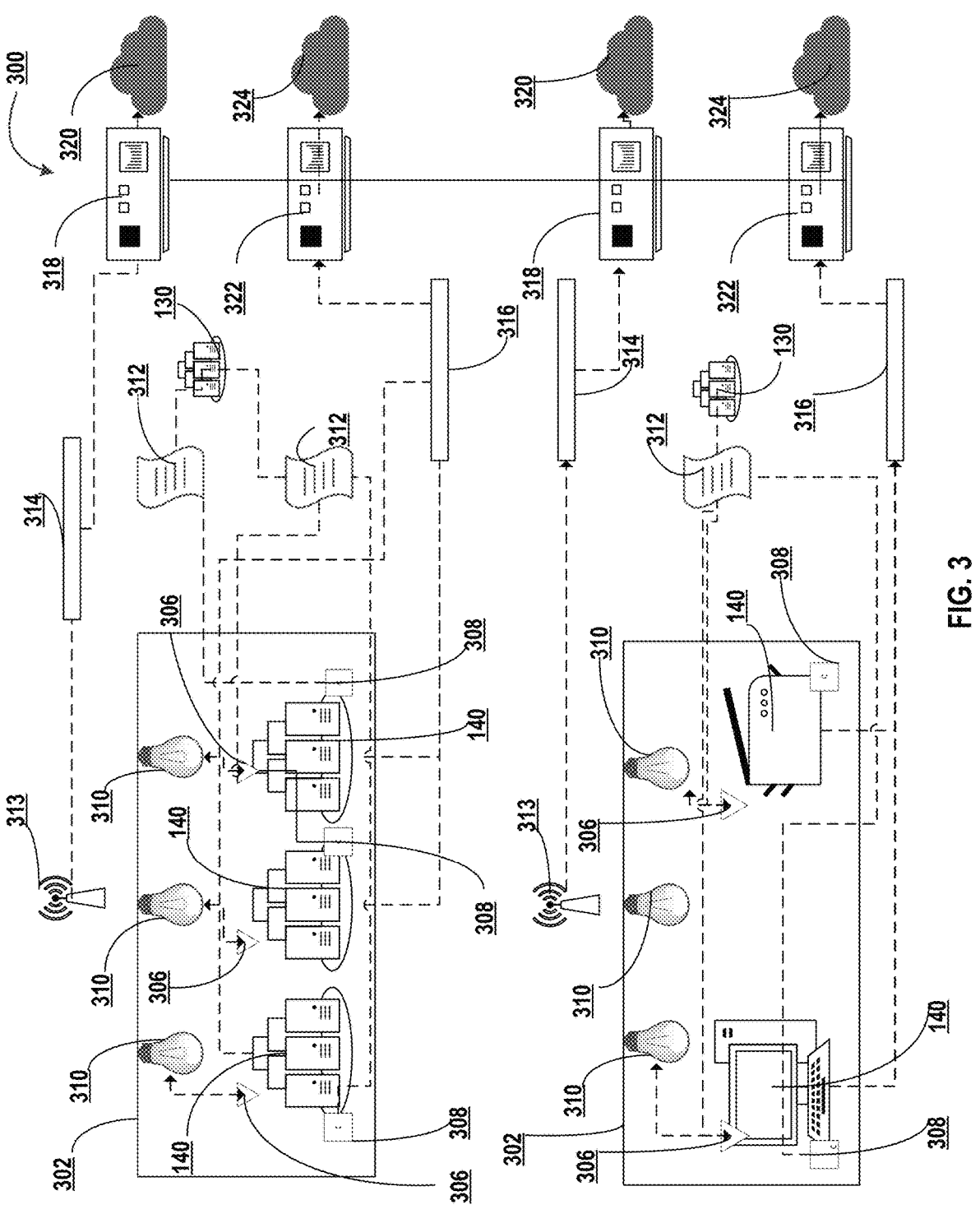

Having thus described embodiments of the invention in general terms, reference will now be made the accompanying drawings, wherein:

FIGS. 1A-1C illustrate technical components of an exemplary distributed computing environment for selective data routing in a distributed network via data throughput analysis in a distributed ledger network, in accordance with an embodiment of the invention;

FIG. 2 illustrates a flow diagram for selective data routing in a distributed network via data throughput analysis, in accordance with an embodiment of the invention; and FIG. 3 illustrates a data flow graph for selective data routing in a distributed network via data throughput analysis, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" or "user interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, a transmission of a digital audio signal, or the like. As used herein, an "interacting user" may refer to a user who is engaging in the interaction, such as a caller to a helpdesk, a customer interacting with a digital assistant, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Prior to the invention described herein, the existing technological solutions for data routing were inadequate. In optical fiber networks, data often faced bottlenecks, causing frequent but less resource-intensive data transmissions to be delayed or even blocked by larger data transmissions. This situation would frequently disrupt routine operations, bringing them to a halt until the larger data transmission(s) were completed. The absence of an effective mechanism to prioritize and manage data flow resulted in a significant limitation in the overall efficiency of the system.

The challenge lay in providing solutions to inadequate data routing solutions. Developing a solution necessitates expertise in network architecture, data transmission protocols, and traffic management techniques. Addressing the aforementioned challenges demands the ability to design and implement scalable and efficient algorithms that can prioritize and allocate network resources effectively. Balancing the needs of different data transmissions, managing bottlenecks, and ensuring uninterrupted data flow are crucial aspects that must be considered, and any solution should be adaptable to evolving network demands, technological advancements, and the varying volumes of data.

The invention disclosed herein provides a solution. The solution described herein implements an approach to routing data in a manner that preserves bandwidth. Instead of routing all data through a single optical fiber cable, the bandwidth requirement of a data transmission is determined via a collaboration between a routing module, coupled to a device, and a classification engine. Using the bandwidth requirement, a determination is made by the classification engine as to whether the bandwidth is above or below a predetermined threshold. Then, based on this determination, the data is routed through a selected infrastructure. By leveraging this approach, the technology provides a robust and efficient means of transferring data within a distributed network.

Accordingly, the present disclosure provides for selective data routing in a distributed network via data throughput analysis in a distributed ledger network. Routing modules are responsible for managing and connecting a classification engine to the endpoint devices. These routing modules act as gateways or proxies for communication between the endpoint devices and the network. The flow of data from the endpoint device goes through the routing module, which connects to the classification engine. The classification engine evaluates the data based on predefined rules to determine the amount of data to be transmitted and processed. It then sends this classification information back to the routing module, which queues the data for transmission based on the classification. To prevent performance issues or bottlenecks, data can be redirected either through Li-Fi or multicore fiber optic connections, depending on the specific endpoint device in use and/or data traffic corresponding to the specific endpoint device. This ensures efficient data transmission, particularly when dealing with high workloads. For example, when printing or processing a small JSON file, the data will pass through the Li-Fi or fiber optic connection based on the transmission requirements. Multiple classification engines can be enabled to ensure efficiency and avoid production downtime. Each classification engine connects to various endpoint devices within a bank branch or data center. When it comes to traffic control, the classification engine monitors and manages individual endpoint devices separately. Each endpoint device has its own controller, allowing for precise control. For example, if Endpoint device A requires 400 MB, it will utilize the multicore fiber optic connection, while Endpoint device B, needing only 20 MB, will still use Li-Fi. This simultaneous execution prevents overwhelming the Li-Fi and multicore fiber optic network capacities with excessive data. To regulate the information flow, a queue control system is implemented. The queue controller ensures that the data transmission process for each endpoint device is either on standby or completed before moving on to the next endpoint device. Running all endpoint devices simultaneously through multiple fiber connections would not be practical, as the main function of the queue control is to maintain efficient data flow.

Furthermore, the present invention offers a technical solution to address a specific problem in data routing. As outlined earlier, the challenge includes inadequate data routing methods, where smaller transmissions are frequently hindered by larger ones, causing delays and disruptions. The problem arises due to the lack of an efficient mechanism to prioritize and manage data flow, resulting in reduced system efficiency. The technical solution presented herein involves the development of an intelligent routing system that accurately identifies, routes, and prioritizes data transmissions based on their size and importance. By dynamically managing and balancing data traffic, the system ensures smooth and uninterrupted data flow, enhancing overall network performance. This solution overcomes the limitations of existing data routing approaches by effectively optimizing data transmission (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing and manual resources.

FIGS. 1A-1C illustrate technical components of an exemplary distributed computing environment 100 for selective data routing in a distributed network via data throughput analysis in a distributed ledger network, in accordance with an embodiment of the invention. As shown in FIG. 1A, the distributed computing environment 100 contemplated herein may include a system 130, an endpoint device(s) 140, and a network 110 over which the system 130 and endpoint device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the endpoint device(s) 140 may have a client-server relationship in which the endpoint device(s) 140 are remote devices that request and receive service from a centralized server, i.e., the system 130. In some other embodiments, the system 130 and the endpoint device(s) 140 may have a peer-to-peer relationship in which the system 130 and the endpoint device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The endpoint device(s) 140 may represent various forms of electronic devices, including user input devices such as personal digital assistants, cellular telephones, smartphones, laptops, desktops, printers, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and one or more storage devices 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the one or more storage devices 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the endpoint device(s) 140, in accordance with an embodiment of the disclosure. As shown in FIG. 1C, the endpoint device(s) 140 includes a processor 152, memory 154, an input/output device such as a display 156, a communication interface 158, and a transceiver 160, among other components. The endpoint device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the endpoint device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the endpoint device(s) 140, such as control of user interfaces, applications run by endpoint device(s) 140, and wireless communication by endpoint device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of endpoint device(s) 140 with other devices. External interface 168 may provide, for example, for wired communication in some implementations, or for wireless communication in other implementations, and multiple interfaces may also be used.

The memory 154 stores information within the endpoint device(s) 140. The memory 154 can be implemented as one or more of a computer-readable medium or media, a volatile memory unit or units, or a non-volatile memory unit or units. Expansion memory may also be provided and connected to endpoint device(s) 140 through an expansion interface (not shown), which may include, for example, a SIMM (Single In Line Memory Module) card interface. Such expansion memory may provide extra storage space for endpoint device(s) 140 or may also store applications or other information therein. In some embodiments, expansion memory may include instructions to carry out or supplement the processes described above and may include secure information also. For example, expansion memory may be provided as a security module for endpoint device(s) 140 and may be programmed with instructions that permit secure use of endpoint device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the endpoint device(s) 140 to transmit and/or receive information or commands to and from the system 130 via the network 110. Any communication between the system 130 and the endpoint device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the endpoint device(s) 140 may provide the system 130 (or other client devices) permissioned access to the protected resources of the endpoint device(s) 140, which may include a GPS device, an image capturing component (e.g., camera), a microphone, and/or a speaker.

The endpoint device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, Li-Fi, or other such transceiver (not shown). In addition, GPS (Global Positioning System) receiver module 170 may provide additional navigation- and location-related wireless data to endpoint device(s) 140, which may be used as appropriate by applications running thereon, and in some embodiments, one or more applications operating on the system 130.

The endpoint device(s) 140 may also communicate audibly using audio codec 162, which may receive spoken information from a user and convert the spoken information to usable digital information. Audio codec 162 may likewise generate audible sound for a user, such as through a speaker, e.g., in a handset of endpoint device(s) 140. Such sound may include sound from voice telephone calls, may include recorded sound (e.g., voice messages, music files, etc.) and may also include sound generated by one or more applications operating on the endpoint device(s) 140, and in some embodiments, one or more applications operating on the system 130.

Various implementations of the distributed computing environment 100, including the system 130, and endpoint device(s) 140, and techniques described here can be realized in digital electronic circuitry, integrated circuitry, specially designed ASICs (application specific integrated circuits), computer hardware, firmware, software, and/or combinations thereof.

FIGS. 2 and 3 illustrate a flow diagram 200 and a data flow graph 300 for selective data routing in a distributed network via data throughput analysis, in accordance with an embodiment of the invention. The process may begin at block 202, where the system 130 receives a request for data transmission from an endpoint device 140 of a network. An endpoint device 140 may provide such a request through any number of activities associated with the endpoint device 140 such as user input, Application Programming Interface ("API") calls to request data transmission, scheduled transmissions or events, and network-based triggers.

Endpoint devices 140 of the network each contain a routing module 306. In some embodiments, the routing module 306 may refer to the same module as the communication interface 158. However, in other embodiments, the routing module 306 of the endpoint device 140 may be a supplemental communication interface in addition to communication interface 158. In some embodiments, the routing module 306 is hardware device that has both Li-Fi and wired LAN ports (i.e., ethernet ports, also known as RJ-45 ports) to accommodate wired connection via the wired LAN port(s) and wireless connections via the Li-Fi port(s). As will be described in detail herein, the choice between transmitting data using the Li-Fi port(s) or wired LAN port(s) depends on characteristics of the data transmission, as will be determined by the system 130.

References herein to "Li-Fi" refer to non-transitory wireless communication signals through a dedicated infrastructure (i.e., first routing channel) involving Li-Fi devices 310 (i.e., Li-Fi bulbs or "emitter devices") that allow connection to the endpoint device(s) through the routing module 306.

Network traffic that is transmitted via the wired LAN port(s) is ultimately routed to a dedicated infrastructure (i.e., second routing channel) consisting of a multicore optical fiber cable (first multicore optical fiber 316). Accordingly, in some embodiments, instead of, or in addition to, an RJ-45 ethernet port on the routing module 306, the routing module 306 may include an optical fiber port to connect directly with the multicore optical fiber. However, in other embodiments, the wired LAN connection is hardwired through an RJ-45 cable or similar, which is operatively coupled to an optical fiber transceiver to convert ethernet signals to optical signals and vice-versa. This optical fiber transceiver may be positioned between the optical fiber network (comprising the first multicore optical fiber 316) and the ethernet port of the routing module 306 such as to facilitate transmission of data.

The routing module 306 may also be equipped with a bandwidth monitoring tool, which collects real-time data flow information such as network usage, throughput of data (i.e., volume of data transmitted), packet loss, latency, total number of packets transmitted, source and destination IP addresses, protocols used, volume of data transferred, and application-specific statutes. The bandwidth monitoring tool provides this data flow information to the system 130. As shown in block 204 the process may continue where the system 130 determines, via the routing module 306, a throughput of data associated with the data transmission. The system 130 may receive, ping, or otherwise request the throughput data (bandwidth information) of any given endpoint device 140 from the bandwidth monitoring tool of the routing module 306.

In some embodiments, the bandwidth monitoring tool may comprise software-based monitoring to monitor bandwidth usage, where a protocol such as Simple Network Management Protocol (SNMP), NetFlow, sFlow or the like, where the routing module 306 collects network traffic data and generates reports on bandwidth usage, such as the amount of data transmitted and received by specific devices or applications. These reports can be accessed and analyzed through a web-based interface or exported to external monitoring systems.

Additionally, or alternatively, in some embodiments the bandwidth monitoring tool may comprise hardware-based monitoring to monitor bandwidth usage, where a hardware module captures and analyzes network packets directly at the hardware level, allowing for direct monitoring of bandwidth usage. It shall be appreciated that in some embodiments, both a software-based monitoring and a hardware-based monitoring solution may be implemented, for example, the routing module 306's bandwidth monitoring tool software might collect basic bandwidth data, while a separate bandwidth monitoring tool hardware module may provide more advanced analysis and reporting features.

In some embodiments, the routing module 306 is operatively coupled to a classification engine 312. As will be described with respect to block 206, the classification engine 312 is an engine of the system 130 that determines a classification of the throughput of the data, or in other words determines a category of the data transmission based on how much data is being transmitted, or requested to be transmitted.

In some embodiments, the routing module 306 is operatively coupled to multiple classification engines 312, such that the routing module 306 may be operatively coupled to a first classification engine 312 and a second classification engine 312. Including multiple classification engines 312 improves resiliency, ensuring that any given endpoint device 140 is not reliant on a single classification engine 312. For example, Computer A may be operatively coupled to Classification Engine A as a primary classification engine, and Classification Engine B as a secondary classification engine. In the event that there is a malfunction of Classification Engine A, a control signal is transmitted by the system 130 to revert to Classification Engine B for a predetermined amount of time, or until Classification Engine A is on-line again.

In some embodiments, a particular endpoint device 140 may share a classification engine 312 with one or more other endpoint devices 140. For example, Computer A may be operatively coupled to Classification Engine A as its primary classification engine, while Computer B and/or Computer C may also be operatively coupled to Classification Engine A as a primary classification engine.

Additionally, or alternatively, some endpoint devices 140, such as supercomputers, may contain a plurality of routing modules 306. Each one of these plurality of routing modules 306 for the given endpoint device 140 may then be operatively coupled to a different classification engine 312 for distributed processing. Such distributed processing may allow for such endpoint devices 140 to handle large-scale data processing tasks efficiently. By leveraging multiple routing modules 306, each connected to a distinct classification engine 312, the workload can be divided and processed concurrently. This distributed processing approach enhances computational speed and improves overall system performance. For example, Computer A may have three (3) distinct routing modules 306: Module A, Module B, and Module C. Module A may be operatively coupled to Classification Engine A, Module B may be operatively coupled to Classification Engine B, and Module C may be operatively coupled to Classification Engine C.

While the prior example references three (3) routing modules 306 with each being operatively coupled to distinct classification engines 312, it shall be appreciated that any combination of the above embodiments may be implemented. For example, Computer A may have three (3) distinct routing modules 306: Module A, Module B, and Module C. Module A may be operatively coupled to Classification Engine A, Module B may be operatively coupled to Classification Engine B. However, Module C may also be operatively coupled to Classification Engine B.

The process continues in block 206, where the system 130 determines a classification of the data transmission, via the classification engine 312. As previously described, the routing module 306 may contain a bandwidth monitoring tool, the output of which is a measurement of throughput of a data transmission. After a data transmission is initiated to and/or from an endpoint device 140, the bandwidth monitoring tool of the routing module 306 may output a throughput of data associated with an instant data transmission. The throughput of data may be reported as bits per second (bps), kilobits per second (Kbps), megabits per second (Mbps), gigabits per second (Gbps), terabits per second (Tbps), and so forth.

The classification occurs as a result of the throughput of the data associated with a data transmission being above or below a predetermined threshold. In other words, a determination of a classification may be made based on whether the throughput of data is below or above this predetermined threshold. For example, a predetermined threshold may be set at 10 Mbps, and the throughput of the data may be provided by the bandwidth monitoring tool as 9 Mbps, which is below the predetermined threshold. Accordingly, this data transmission may be classified as being a "light data transmission." However, the throughput of the data may be provided by the bandwidth monitoring tool as 20 Mbps, which is above the predetermined threshold of 10 Mbps. Accordingly, this data transmission may be classified as being a "heavy data transmission."

The system 130, using the routing module 306 of the endpoint device 140 (and the bandwidth monitoring tool therein), may distinguish between separate data transmissions using IP addresses, MAC addresses, and port numbers. By examining the IP addresses in packet headers, the routing module 306 may determine the destination and routing path for each packet. Port numbers in the transport layer allow the routing module 306 to identify the application or service associated with a packet. For a given combination of destination and routing path and/or application associated with a packet, the bandwidth monitoring tool in combination with the classification engine 312 may re-evaluate the throughput of the data and the corresponding classification at a predetermined time interval, such as every second, every 30 seconds, ever hour, and so forth. Additionally, or alternatively, a data transmission of a particular application associated with a packet may be predetermined to always be one classification (such as "heavy data transmission") without additional monitoring for the duration of the data transmission.

The process may continue as shown in block 208, where the system 130 assigns the data transmission to an assigned routing channel. The system 130 herein utilizes a first routing channel and a second routing channel.

The first routing channel may be a Li-Fi network 313 comprised of one or more emitter devices 310 (i.e., Li-Fi bulbs). This first routing channel may be ideal for light data transmissions (e.g., light loads). The first routing channel, which utilizes Li-Fi technology, capitalizes on the capabilities of one or more emitter devices 310. As will be understood by one skilled in the art, Li-Fi, or "Light Fidelity", enables data transmission through the use of light waves, making it well-suited for light data loads.

The second routing channel may be a first multicore optical fiber cable 316, configured to allow for heavy data transmissions (i.e., heavy loads) various data transfers to occur in discrete portions of the first multicore optical fiber cable 316. This second routing channel, with its first multicore optical fiber cable 316, is specifically designed to handle heavy data transmissions within the discrete segments of the multicore optical fiber cable.

Accordingly, there are two distinct routing channels available for any given data transmission. By providing two distinct routing channels, the system 130 offers flexibility and optimization for various data transfer requirements. The selection of the routing channel depends on the throughput of the data and the corresponding classification of the data transmission, as is determined by the classification engine 312.

Referring back to the first routing channel, in some embodiments the emitter devices 310 may be operatively coupled to a second multicore optical fiber 314. This second multicore optical fiber 314 may be distinct from the first multicore optical fiber 316. It shall be understood that the multicore optical fiber of the second routing channel (e.g., the routing channel dedicated to heavy data transmissions) is operatively coupled to a first network carrier 324. However, in embodiments where the emitter devices 310 of the first routing channel are operatively coupled to a second multicore optical fiber 314, the second multicore optical fiber 314 may be operatively coupled to a second network carrier 320.

The system 130 assigns a routing channel based on the instructions provided by a signal given to the routing module 306 from the classification engine 312. As described, the then assigned routing channel is determined based on classification and can be either the first routing channel or the second routing channel. The first routing channel typically represents a network suitable for light data loads, consisting of emitter devices 310 connected to endpoint devices 140 in close proximity. Meanwhile, the second routing channel typically represents a network designed for heavy data loads, utilizing a first multicore optical fiber 316 configuration.

For example, the classification engine 312 may determine that the amount of data transferring to and/or from an endpoint device 140 is above a predetermined threshold, and thus is a heavy data transmission. The classification engine 312 then sends an indication to the system 130, which instructs the routing module 306 to assign the appropriate routing channel for the data transmission. This dynamic allocation of routing channels ensures efficient utilization of network resources based on real-time data demands. By intelligently adapting to the data load requirements, the system 130 optimizes bandwidth usage and minimizes latency, resulting in enhanced overall performance.

In terms of data security, the routing mechanism is agnostic. All data is encrypted, and security features are enabled. Regardless of whether the data is transmitted through wireless or fiber optic connections, the security measures remain consistent. The specific applications handling the data determine the processing requirements, but the underlying security protocols remain unchanged.

In some embodiments, the process continues illustrated in block 210, where the system 130 may proceed to queue the data transmission using a queue controller 308. While the data transmission has been assigned to a routing channel, it may be beneficial from a bandwidth preservation standpoint to not immediately proceed with the data transmission, but instead collect the data in a memory device or buffer device while other data transmissions are permitted to proceed. In this way, a queue controller 308 is necessary to prioritize and manage the order and progression of data transmission for one or more given endpoint devices 140.

Queue controllers 308 may be operatively coupled to each of the routing modules 306 of a plurality of endpoint devices 140. In embodiments where the queue controller 308 is implemented, the queue controller 308 provides a control signal to the routing module 306 of the endpoint device 140 when it is determined by the queue controller 308 and/or system 130 that the data should be transmitted, according to predefined rules. This control signal instructs the corresponding routing module 306 to proceed with the data transmission.

System 130 maintains a primary queue list of all network traffic, this queue lists being transmitted, in real time, to each of the queue controllers 308. The primary queue list dictates to the queue controllers 308 of each endpoint device 140, when to transmit data. In such embodiments, queue controllers 308 act as a communication controller, sending and receiving directives from the system 130 based on the system 130's primary queueing.

For example, queue controller 308 of Device A and the queue controller 308 of Device B may be supplied the same queue order by system 130, indicating that specified data should be transmitted from Device A prior to Device B. Once Device A has transmitted the data, the queue controller 308 of Device A may either send a control signal directly to the queue controller 308 of Device B to indicate that Device B should next transmit the data on Device B, or queue controller 308 of Device A may send a control signal to the system 130 to update the primary queue list, which is then transmitted to each of the queue controller 308 in the network.

In embodiments where multiple endpoint devices 140 are connected to the system 130, the queue controller 308 ensures that data transmissions for each appliance are appropriately queued. It ensures that data is either placed on standby if not yet initiated or marked as completed once transmission is finished.

As one non-limiting example, an entity automation system comprises the endpoint devices 140 of Devices A, B, and C. Device A could be an automated mechanism, Device B a mechanical component, and Device C a sensing device. When data transmissions are initiated, the system 130 employs logical decision-making based on predefined rules to prioritize and communicates the primary queue list with the queue controller 308 of each associated endpoint device 140 to queue the data appropriately.

In this example, Device A requires a command to perform a specific task, Device B needs to receive instructions for adjusting its operation, and Device C is responsible for monitoring the system for irregularities. If Device A requires an immediate action due time-sensitive operations, the system 130 prioritizes its data transmission and ensures it is placed at the top of the primary queue list, which in turn is received by each queue controller 308, such that Device A may transmit the data at the next opportunity, and the queue controllers 308 of Devices B and C to holding the data transmission in a memory device or buffer. The system 130 may be programmed to always prioritize Device A data transmissions over other devices. Once Device A's data transmission is completed, the primary queue list is updated and Device B is accordingly queued for data transmission, as it requires precise timing coordination with Device A. In this way, the system 130 may be programmed to always follow Device A data transmissions with those of Device B. Device B's data transmission is prioritized to ensure synchronization between the automated mechanism and the mechanical component.

Meanwhile, Device C's data transmission, related to monitoring and irregularity detection, might have a lower priority but is still crucial for overall system efficiency. The system 130 ensures that Device C's data transmission is appropriately queued, taking into account its monitoring frequency and the significance of real-time irregularity detection.

The predefined rules for system 130 determining the order of data transmission from multiple endpoint devices 140 could include prioritization based on factors such as urgency, order, and criticality. For example, port data information gathered by the routing module 306 may be supplied to the system 130 to identify the application or service associated with the packet, where a predetermined order of all applications or services has been provided to the system 130, such that if any given application or service (of any endpoint device 140) with a data transmission is higher on the predetermined order than others, this data transmission with be first in the queue. Other embodiments may utilize the IP address of MAC address of a given endpoint device 140 associated with a data transmission, where a predetermined order of all available endpoint devices 140 has been provided to the system 130, such that if any given endpoint device 140 with a data transmission is higher on the predetermined order than others, this data transmission with be first in the queue.

The process may continue at block 212, where the queue controller 308 (or in embodiments without a queue controller 308—the system 130, generally), transmits control signals to the routing module 306 to route the data transmission to the assigned routing channel. These control signals are instructions to, once the data is to be transmitted, direct the data transmission to the assigned routing channel. By communicating with the routing module 306, the queue controller 308 prepares for directing the data to appropriate routing channel as determined previously.

It shall be appreciated that in any given network of endpoint devices 140, data transmission is ongoing and continuous. Thus, the assigned routing channel may change over the course of a data transmission. Accordingly, if Data Transmission A is being transmitted via the first routing channel, changes in queue, bandwidth usage (determined by throughput of data), etc., may require that Data Transmission A be switched to the second routing channel.

The endpoint device 140 may then transmits the data via the assigned routing channel. In some embodiments, the transmission of the data may be initiated by the system 130 once the data has been appropriately queued and prepared for transmission, by initiating the routing module 306 to transmit the data. In other embodiments, the endpoint device 140 via the routing module 306 initiates the transmission of the data, then communicates via the queue controller 308 to the system 130 that the data has been transmitted. Thereafter, the system 130 may update the primary queue list to remove reference to the instant data transmission.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for selective data routing in a distributed network via data throughput analysis in a distributed ledger network, the system comprising:
   a processing device; and
   a non-transitory storage device comprising instructions that, when executed by the processing device, causes the processing device to perform the steps of:
   receive a request for a data transmission from an endpoint device of a network, wherein the endpoint device comprises a routing module;
   receive, via the routing module, data associated with the data transmission;
      determine, via the routing module, a throughput of the data associated with the data transmission;
      determine a classification of the data transmission, via a classification engine, wherein the classification is based on the determined throughput of the data associated with the data transmission;
   assign the data transmission to an assigned routing channel, wherein the assigned routing channel comprises either a first routing channel or a second routing channel based on the classification, wherein the first routing channel is a light load network, and wherein the second routing channel is a heavy load network comprising a first multicore optical fiber;
   queue the data transmission via a queue controller; and
      transmit control signals to the routing module to route the data transmission to the assigned routing channel.

2. The system of claim 1, wherein the routing module is operatively coupled to the classification engine and a second classification engine.

3. The system of claim 2, wherein the second classification engine is operatively coupled to the routing modules corresponding to a plurality of endpoint devices.

4. The system of claim 1, wherein the queue controller ensures that the data transmission for the endpoint device is either on standby or completed before moving on to a second endpoint device.

5. The system of claim 1, wherein the light load network comprises emitter devices operatively coupled to endpoint devices proximate the emitter devices, wherein the emitter devices are operatively coupled to a second multicore optical fiber, and wherein the first multicore optical fiber is operatively coupled to a first network carrier and the second multicore optical fiber is operatively coupled to a second network carrier.

6. The system of claim 1, wherein assigning the data transmission to an assigned routing channel comprises:
   assigning the data transmission to the first routing channel when the throughput of the data is below the predetermined threshold.

7. The system of claim 1, wherein assigning the data transmission to an assigned routing channel comprises:
   assigning the data transmission to the second routing channel when the throughput of the data is above the predetermined threshold.

8. A computer program product for selective data routing in a distributed network via data throughput analysis in a distributed ledger network, the computer program product comprising a non-transitory computer-readable medium comprising code causing an apparatus to:
   receive a request for a data transmission from an endpoint device of a network, wherein the endpoint device comprises a routing module;
   receive, via the routing module, data associated with the data transmission;
      determine, via the routing module, a throughput of the data associated with the data transmission;
      determine a classification of the data transmission, via a classification engine, wherein the classification is based on the determined throughput of the data associated with the data transmission;
   assign the data transmission to an assigned routing channel, wherein the assigned routing channel comprises either a first routing channel or a second routing channel based on the classification, wherein the first routing channel is a light load network, and wherein the second routing channel is a heavy load network comprising a first multicore optical fiber;
   queue the data transmission via a queue controller; and
      transmit control signals to the routing module to route the data transmission to the assigned routing channel.

9. The computer program product of claim 8, wherein the routing module is operatively coupled to the classification engine and to a second classification engine.

10. The computer program product of claim 9, wherein the second classification engine is operatively coupled to the routing modules corresponding to a plurality of endpoint devices.

11. The computer program product of claim 8, wherein the queue controller ensures that the data transmission for the endpoint device is either on standby or completed before moving on to a second endpoint device.

12. The computer program product of claim 8, wherein the light load network comprises emitter devices operatively coupled to endpoint devices proximate the emitter devices, wherein the emitter devices are operatively coupled to a second multicore optical fiber, and wherein the first multicore optical fiber is operatively coupled to a first network carrier and the second multicore optical fiber is operatively coupled to a second network carrier.

13. The computer program product of claim 8, wherein assigning the data transmission to an assigned routing channel comprises:

assigning the data transmission to the first routing channel when the throughput of the data is below the predetermined threshold.

14. The computer program product of claim 8, wherein assigning the data transmission to an assigned routing channel comprises:

assigning the data transmission to the second routing channel when the throughput of the data is above the predetermined threshold.

15. A method for selective data routing in a distributed network via data throughput analysis in a distributed ledger network, the method comprising:

receiving a request for a data transmission from an endpoint device of a network, wherein the endpoint device comprises a routing module;

receiving, via the routing module, data associated with the data transmission;

determining, via the routing module, a throughput of the data associated with the data transmission;

determining a classification of the data transmission, via a classification engine, wherein the classification is based on the determined throughput of the data associated with the data transmission;

assigning the data transmission to an assigned routing channel, wherein the assigned routing channel comprises either a first routing channel or a second routing channel based on the classification, wherein the first routing channel is a light load network, and wherein the second routing channel is a heavy load network comprising a first multicore optical fiber;

queueing the data transmission via a queue controller; and transmitting control signals to the routing module to route the data transmission to the assigned routing channel.

16. The method of claim 15, wherein the routing module is operatively coupled to the classification engine and a second classification engine.

17. The method of claim 16, wherein the second classification engine is operatively coupled to the routing modules corresponding to a plurality of endpoint devices.

18. The method of claim 15, wherein the queue controller ensures that the data transmission for the endpoint device is either on standby or completed before moving on to a second endpoint device.

19. The method of claim 15, wherein the light load network comprises emitter devices operatively coupled to endpoint devices proximate the emitter devices, wherein the emitter devices are operatively coupled to a second multicore optical fiber, and wherein the first multicore optical fiber is operatively coupled to a first network carrier and the second multicore optical fiber is operatively coupled to a second network carrier.

20. The method of claim 15, wherein assigning the data transmission to an assigned routing channel comprises:

assigning the data transmission to the second routing channel when the throughput of the data is above the predetermined threshold.

* * * * *